(12) United States Patent
Kim et al.

(10) Patent No.: US 10,200,155 B2
(45) Date of Patent: Feb. 5, 2019

(54) ONE-WAY DATA TRANSMISSION APPARATUS, ONE-WAY DATA RECEPTION APPARATUS, AND ONE-WAY DATA TRANSMISSION/RECEPTION METHOD USING THE SAME

(71) Applicant: ELECTRONICS AND TELECOMMUNICATIONS RESEARCH INSTITUTE, Daejeon (KR)

(72) Inventors: Byoung-Koo Kim, Daejeon (KR); Seon-Gyoung Sohn, Daejeon (KR); Boo-Sun Jeon, Daejeon (KR); Young-Jun Heo, Daejeon (KR); Dong-Ho Kang, Daejeon (KR); Jung-Chan Na, Daejeon (KR); Byeong-Cheol Choi, Daejeon (KR); Jae-Hoon Nah, Daejeon (KR); Seoung-Hyeon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 18 days.

(21) Appl. No.: 15/641,141

(22) Filed: Jul. 3, 2017

(65) Prior Publication Data

US 2018/0109356 A1    Apr. 19, 2018

(30) Foreign Application Priority Data

Oct. 18, 2016    (KR) .................. 10-2016-0134969

(51) Int. Cl.
*H04L 1/00*    (2006.01)
*H04L 12/24*   (2006.01)
(Continued)

(52) U.S. Cl.
CPC .......... *H04L 1/0075* (2013.01); *H04L 1/0041* (2013.01); *H04L 1/0045* (2013.01);
(Continued)

(58) Field of Classification Search
CPC ... H04L 1/0075; H04L 1/0041; H04L 1/0045; H04L 41/0806; H04L 41/0866; H04L 43/0835; H04L 63/0281
(Continued)

(56) References Cited

U.S. PATENT DOCUMENTS 5,617,418 A * 4/1997 Shirani .................. H04L 12/44
                                                       370/402
7,675,867 B1 * 3/2010 Mraz ...................... H04L 63/123
                                                       370/254
(Continued)

FOREIGN PATENT DOCUMENTS

KR    10-2005-0118283 A    12/2005
KR       10-1334240 B1    11/2013
(Continued)

OTHER PUBLICATIONS

Ji-Hee Kim et al., "Power distribution DAS-business network security issues and physical one-way data transmission system," Journla of Korea Institute of Information Security & Cryptology, 2014, pp. 46-50.

*Primary Examiner* — John J Tabone, Jr.

(57) ABSTRACT

Disclosed herein are a one-way data transmission apparatus, a one-way data reception apparatus, and a one-way data transmission/reception method using the apparatuses. The one-way data transmission/reception method uses a one-way data transmission apparatus and a one-way data reception apparatus, and includes receiving data from a high-security zone through a one-way path, generating tag information of the data, sending a message in which the tag information is added to the data to the one-way data reception apparatus,
(Continued)

receiving the message from the one-way data transmission apparatus, checking the tag information of the message, and transmitting the data to a low-security zone.

19 Claims, 9 Drawing Sheets

(51) Int. Cl.
  *H04L 12/26* (2006.01)
  *H04L 29/06* (2006.01)
(52) U.S. Cl.
  CPC ...... *H04L 41/0806* (2013.01); *H04L 41/0866* (2013.01); *H04L 43/0835* (2013.01); *H04L 63/0281* (2013.01)
(58) Field of Classification Search
  USPC ......... 714/776, 712, 751, 752, 786; 375/220
  See application file for complete search history.

(56) References Cited

U.S. PATENT DOCUMENTS

| | | | | |
|---|---|---|---|---|
| 9,397,790 | B2 * | 7/2016 | Baek | H04L 1/1607 |
| 9,565,162 | B2 * | 2/2017 | Kim | H04L 63/0245 |
| 9,602,409 | B2 * | 3/2017 | Kim | H04L 47/10 |
| 9,749,011 | B2 * | 8/2017 | Kim | H04B 3/50 |
| 9,800,546 | B2 * | 10/2017 | Kim | H04L 67/28 |
| 2003/0076780 | A1 * | 4/2003 | Loge | H04L 49/309 370/229 |
| 2010/0326211 | A1 * | 12/2010 | Stein | A61B 5/4528 73/862.636 |
| 2011/0319755 | A1 * | 12/2011 | Stein | A61B 5/0031 600/437 |
| 2013/0212659 | A1 * | 8/2013 | Maher | H04L 63/06 726/6 |
| 2014/0215609 | A1 * | 7/2014 | Fukami | H04L 63/1408 726/22 |
| 2015/0215075 | A1 | 7/2015 | Baek et al. | |
| 2015/0261810 | A1 * | 9/2015 | Kim | G06F 21/6218 707/687 |
| 2015/0365346 | A1 * | 12/2015 | Kim | H04L 47/10 370/230 |
| 2015/0365378 | A1 * | 12/2015 | Kim | H04L 63/0245 726/13 |
| 2016/0080033 | A1 | 3/2016 | Kim et al. | |
| 2016/0261561 | A1 * | 9/2016 | Kim | H04L 67/28 |
| 2017/0294054 | A1 * | 10/2017 | Rosenbaum | F02D 41/2406 |

FOREIGN PATENT DOCUMENTS

| | | |
|---|---|---|
| KR | 10-1509496 B1 | 4/2015 |
| KR | 10-2015-0142719 A | 12/2015 |
| WO | WO 2004/084477 A1 | 9/2004 |

* cited by examiner

ONE-WAY DATA TRANSMISSION APPARATUS, ONE-WAY DATA RECEPTION APPARATUS, AND ONE-WAY DATA TRANSMISSION/RECEPTION METHOD USING THE SAME

CROSS REFERENCE TO RELATED APPLICATION

This application claims the benefit of Korean Patent Application No. 10-2016-0134969, filed Oct. 18, 2016, which is hereby incorporated by reference in its entirety into this application.

BACKGROUND OF THE INVENTION

1. Technical Field

The present invention relates generally to secure communication technology and, more particularly, to one-way data transmission technology.

2. Description of the Related Art

Inter-network data transmission technology denotes technology for preventing important data from being leaked due to external hacking and security-related accidents. Recently, such technology has been introduced into a separate closed network (high-security zone) such as a control network, thus enhancing security. A physical one-way data transmission apparatus denotes one of inter-network data transmission technologies, and blocks a physical line that enables data to be transmitted from an external connection network (low-security zone), such as a business network, to a separate closed network, thus completely deleting the external intrusion path itself. In relation to this, research into and development of physical one-way data transmission apparatuses for internal security in various fields have been conducted.

However, data transmission using a type of one-way data transmission/reception system which is physically isolated has constraints in that a Backward Error Correction (BEC, a scheme in which a reception side detects errors and notifies a transmission side of the errors, and in which the errors are corrected via retransmission or the like) used by existing Transmission Control Protocol (TCP)/Internet Protocol (IP)-based services cannot be used, thus making it difficult to guarantee the reliability of data transmission. Therefore, to solve this difficulty, research into various types of techniques has been conducted and the techniques have recently been applied.

Among these techniques, the most effective technique is Forward Error Correction (FEC). FEC techniques may be chiefly classified into PHY-FEC (Physical layer FEC or Byte-level FEC, which generally recovers possible bit errors in a single packet) for recovering data contamination (bit unit), and AL-FEC (Application Layer FEC, Upper Layer FEC or Packet-Level FEC, which recovers packet loss in a network) for recovering data loss caused by packet loss. Basically, since one-way data transmission is an IP-based communication service, it is required to detect and recover errors related to packet loss in order to guarantee reliability. That is, there is a need to guarantee the reliability of data transmission by flexibly and efficiently applying the AL-FEC technique.

Such AL-FEC algorithms are divided into Low-Density Parity-Check (LDPC) code, Tornado code, Luby Transform (LT) code, and RaptorQ algorithms. These algorithms are basically operated in such a way as to transmit a data packet (a source symbol) and a redundant packet (a repair symbol) together in order to recover a lost packet. Here, redundant packets are generated using various methods for respective algorithms, and thus additional network resources are used by the redundant packets, which are generated to recover lost packets. In other words, depending on the configuration of algorithms to be applied, h redundant packets are generated and transmitted every k data packets, and there is a need to suitably apply and operate the value of h, which influences network throughput.

When an FEC technique is applied to a one-way data transmission/reception system, a transmission side and a reception side are generally operated under the same encoding/decoding configuration options (e.g. the ratio of data packets to redundant packets or the like) based on initial configuration. However, during this operation, when there is a need to change encoding/decoding configuration due to variation in a network environment, or to turn on/off the application of the FEC technique, discarded packets may be present due to the difference between application times of the FEC technique on the transmission side and on the reception side. For example, data encoded based on configuration A must be decoded based on the same configuration. However, when the difference between the application times of the FEC technique occurs, a problem may arise in data analysis on the reception side, and thus the corresponding data may be discarded. Moreover, it is basically recommended that the change in the configuration of the one-way data transmission/reception system be applied only to a transmission system located at the boundary of a high-security zone, and thus there is required a technique in which the operations of the transmission side and the reception side are exactly synchronized with each other from the time at which the change in configuration is applied. Further, since the level of reliability required for transmitted data may differ depending on the type of one-way data transmission service and the type of data session in the service, there is a need to apply and operate configurations corresponding to various levels depending on a data transfer path between the transmission side and the reception side.

Consequently, in order to apply an AL-FEC technique to a one-way data transmission/reception system, a wide variety of configurations must be applied depending on the levels of reliability required for the types of one-way data transmission service or for transmission sessions for respective services. To flexibly respond to various requirements, an efficient FEC technique that enables dynamic configuration without causing packet loss is required. However, existing systems do not present definite solutions to these requirements, and the FEC technique has been applied based on uniform configuration.

On the other hand, Korean Patent Application Publication No. 10-2015-0142719 discloses technology entitled "One-way data transmission and reception system, and one-way data transmission and reception method", which minimizes the problem of a buffer overflow that may occur on the reception system of a physical one-way data transmission system while mitigating the problem of data loss attributable to a link error occurring on a one-way communication line of the physical one-way data transmission system.

SUMMARY OF THE INVENTION

Accordingly, the present invention has been made keeping in mind the above problems occurring in the prior art, and an object of the present invention is to effectively provide an Application Layer-FEC (AL-FEC) technique for guaranteeing the reliability of one-way data that is transferred through a one-way data transmission/reception system.

Another object of the present invention is to secure the reliability of one-way transmission data by applying an FEC technique that enables independent dynamic configuration to each one-way path of a data transmission/reception system.

A further object of the present invention is to prevent data loss from occurring due to the change in dynamic configuration depending on variation in a network environment by applying configurations suitable for respective reliability levels to various one-way data transmission paths between a transmission side and a reception side.

Yet another object of the present invention is to enable flexible response to changing required reliability levels by performing a change in dynamic configuration in which a reception side is operated in synchronization with a transmission side merely by applying and changing configuration on the transmission side.

In accordance with an aspect of the present invention to accomplish the above objects, there is provided a one-way data transmission apparatus, including a send proxy unit for receiving data from a high-security zone through a one-way path; a configuration checking unit for determining whether to perform encoding from initial configuration information included in the data; an encoder unit for performing encoding on the data depending on results of the determination as to whether to perform encoding; a tag generation unit for generating tag information based on at least one of whether encoding has been performed and whether the initial configuration information has been changed; and a transmission unit for sending a message in which the tag information is added to the data to a one-way data reception apparatus.

The initial configuration information may include Forward Error Correction (FEC) encoding ON/OFF information including information that indicates whether to perform encoding based on an FEC technique on the data; symbol size information corresponding to a maximum size of a message used to perform the encoding; source symbol number information corresponding to a number of messages on which the encoding is performed; and repair symbol number information corresponding to a number of additional messages generated to be used for recovery when packet loss occurs.

The tag generation unit may be configured to determine whether encoding has been performed on the data and to, if it is determined that encoding has been performed on the data, determine whether the initial configuration information has been changed.

The tag generation unit may be configured to determine whether the initial configuration information has been changed, and to, if the initial configuration information has been changed, generate a first initial configuration tag, add the first initial configuration tag to the tag information, and add the changed initial configuration information to the data.

The tag information may correspond to a bit value, which is identified as any one of 0 and 1 and which indicates whether encoding has been performed and whether the initial configuration information has been changed.

In accordance with another aspect of the present invention to accomplish the above objects, there is provided a one-way data reception apparatus, including a reception unit for receiving a message in which tag information is added to data from a one-way data transmission apparatus; a tag checking unit for checking the tag information and performing at least one of setting of decoding configuration of the data and deletion of the tag information from the message; a decoder unit for performing decoding on the data depending on the setting of the decoding configuration; and a receive proxy unit for transmitting the data to a low-security zone.

The tag checking unit may be configured to check the tag information and to, if the data is found not to be encoded data, delete the tag information from the message.

The tag checking unit may be configured to check the tag information and to, if the data is found to be encoded data, check an initial configuration tag of the tag information and then determine whether the initial configuration information has been changed.

The tag checking unit may be configured to, if it is determined that the initial configuration information has been changed, set decoding configuration based on the changed initial configuration information, and delete the tag information and the initial configuration information from the message.

The tag checking unit may be configured to, if it is determined that the initial configuration information has not been changed, delete the tag information and the initial configuration information from the message.

In accordance with a further aspect of the present invention to accomplish the above objects, there is provided a one-way data transmission/reception method using a one-way data transmission apparatus and a one-way data reception apparatus, including receiving data from a high-security zone through a one-way path; generating tag information of the data; sending a message in which the tag information is added to the data to the one-way data reception apparatus; receiving the message from the one-way data transmission apparatus; checking the tag information of the message; and transmitting the data to a low-security zone.

The initial configuration information may include Forward Error Correction (FEC) encoding ON/OFF information including information that indicates whether to perform encoding based on an FEC technique on the data; symbol size information corresponding to a maximum size of a message used to perform the encoding; source symbol number information corresponding to a number of messages on which the encoding is performed; and repair symbol number information corresponding to a number of additional messages generated to be used for recovery when packet loss occurs.

Generating the tag information may be configured to determine whether encoding has been performed on the data and to, if it is determined that encoding has been performed on the data, determine whether the initial configuration information has been changed.

Generating the tag information may be configured to determine whether the initial configuration information has been changed, and to, if the initial configuration information has been changed, generate a first initial configuration tag, add the first initial configuration tag to the tag information, and add the changed initial configuration information to the data.

The tag information may correspond to a bit value, which is identified as any one of 0 and 1 and which indicates whether encoding has been performed and whether the initial configuration information has been changed.

Checking the tag information may be configured to check the tag information and to, if the data is found not to be encoded data, delete the tag information from the message.

Checking the tag information may be configured to check the tag information and to, if the data is found to be encoded data, check an initial configuration tag of the tag information and then determine whether the initial configuration information has been changed.

Checking the tag information may be configured to, if it is determined that the initial configuration information has been changed, set decoding configuration based on the changed initial configuration information, and delete the tag information and the initial configuration information from the message.

Checking the tag information may be configured to, if it is determined that the initial configuration information has not been changed, delete the tag information and the initial configuration information from the message.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
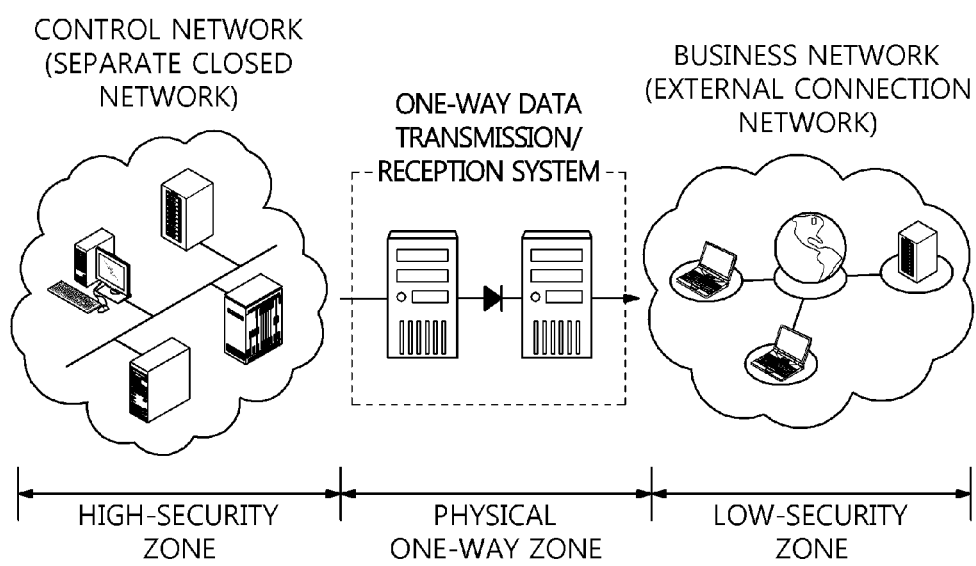
FIG. 1 is a diagram illustrating a one-way data transmission/reception system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that components are present, and are not intended to exclude the possibility that one or more other components thereof will be present or added unless a description to the contrary is specifically pointed out in context.

Hereinafter, preferred embodiments of the present invention will be described in detail with reference to the attached drawings.

FIG. 1 is a diagram illustrating a one-way data transmission/reception system according to an embodiment of the present invention.

Referring to FIG. 1, a region to which the one-way data transmission/reception system according to the present invention is applied includes a high-security zone, a physical one-way zone, and a low-security zone.

The high-security zone may correspond to a control network (a separate closed network), and may transmit data to the outside of the system without receiving data.

The physical one-way zone may be a zone in which the one-way data transmission/reception system is constructed to be able to receive data from the control network in the high-security zone and to transmit data to a business network in the low-security zone.

The low-security zone may correspond to a business network (an external connection network) and may merely receive data without transmitting data to the high-security zone.

Figure 2:
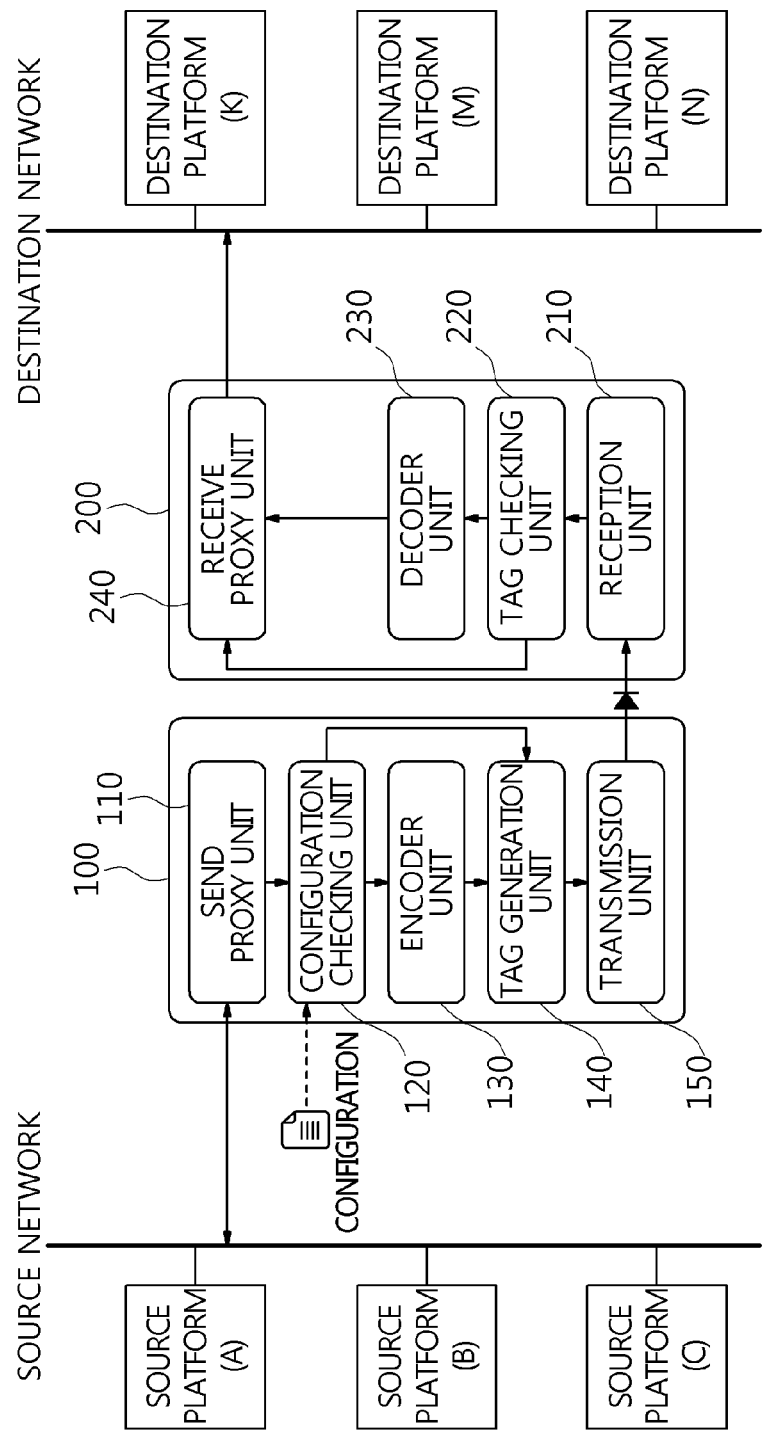
FIG. 2 is a block diagram illustrating a one-way data transmission/reception system according to an embodiment of the present invention.

FIG. 2 is a block diagram illustrating a one-way data transmission/reception system according to an embodiment of the present invention.

The one-way data transmission/reception system according to the embodiment of the present invention, illustrated in FIG. 2, includes a one-way data transmission apparatus 100 and a one-way data reception apparatus 200.

The one-way data transmission apparatus 100 according to an embodiment of the present invention may include a send proxy unit 110, a configuration checking unit 120, an encoder unit 130, a tag generation unit 140, and a transmission unit 150.

The send proxy unit 110 may receive data through a one-way path from a high-security zone.

Here, the send proxy unit 110 may transmit the received data to the corresponding one-way path according to a predefined initial configuration.

The configuration checking unit 120 may determine whether to perform encoding from the initial configuration information included in the data.

Here, the configuration checking unit 120 may determine whether to perform encoding on the received data via an FEC Conf. checker module for checking current configuration.

The encoder unit 130 may perform encoding on the data depending on the results of the determination as to whether to perform encoding.

The tag generation unit 140 may generate tag information based on at least one of whether encoding has been performed and whether initial configuration information has been changed.

Here, the tag generation unit 140 may determine whether encoding has been performed and may determine whether the initial configuration information has been changed if it is determined that encoding has been performed.

If it is determined that encoding has been performed, the tag generation unit 140 may set a tag (FEC TAG) to 1, whereas if it is determined that encoding has not been performed, the tag generation unit 140 may set the FEC TAG to 0.

The tag generation unit 140 may determine whether the initial configuration information has been changed, may generate a first initial configuration tag if it is determined that the initial configuration information has been changed, may add the first initial configuration tag to the tag information, and may add the changed initial configuration information to the data.

The first initial configuration tag may be a tag in which CONF TAG is set to 1.

The tag generation unit 140 may determine whether the initial configuration information has been changed, may generate a second initial configuration tag if it is determined that the initial configuration information has not been changed, and may add the second initial configuration tag to the tag information.

Here, the second initial configuration tag may be a tag in which CONF TAG is set to 0.

That is, the tag information may correspond to a bit value, which is identified as any one of 0 and 1 and which indicates whether encoding has been performed and whether the initial configuration information has been changed.

The transmission unit 150 may send a message in which the tag information is added to the data to the one-way data reception apparatus 200.

Here, if encoding has not been performed, the transmission unit 150 may send a message in which the tag information is added to the data, whereas if encoding has been performed, the transmission unit 150 may send a message in which the tag information, together with the initial configuration information, is added to the data, depending on whether the initial configuration information has been changed.

That is, initial configuration for FEC is present only in the one-way data transmission apparatus 100, and the application of the change using a management tool or the like is also performed only by the one-way data transmission apparatus 100.

The one-way data reception apparatus 200 according to an embodiment of the present invention may include a reception unit 210, a tag checking unit 220, a decoder unit 230, and a receive proxy unit 240.

The reception unit 210 may receive a message in which tag information is added to data from the one-way data transmission apparatus 100.

The tag checking unit 220 may perform at least one of the setting of decoding configuration of the data and the deletion of the tag information from the message by checking the tag information.

Here, the tag checking unit 220 may check the tag information, and may then delete the tag information from the message if the data is not encoded data.

The tag checking unit 220 may check the tag information, and may then determine whether the initial configuration information has been changed by checking the initial configuration tag of the tag information if the data is encoded data.

If it is determined that the initial configuration information has been changed, the tag checking unit 220 may set the configuration of decoding based on the changed initial configuration information and may delete the tag information and the initial configuration information from the message.

On the other hand, if it is determined that the initial configuration information has not been changed, the tag checking unit 220 may delete the tag information and the initial configuration information from the message.

The decoder unit 230 may perform decoding on the data depending on the setting of decoding configuration.

The receive proxy unit 240 may transmit the data to a low-security zone.

Here, the receive proxy unit 240 may transfer the data to the final destination of the low-security zone (a destination network).

Here, if encoding has not been performed, the receive proxy unit 240 may transmit only data in which the tag information is deleted from the message, whereas if encoding has been performed, the receive proxy unit 240 may transmit data, in which the tag information and the initial configuration information are deleted from the message and on which decoding is performed depending on the setting of decoding configuration.

Figure 3:
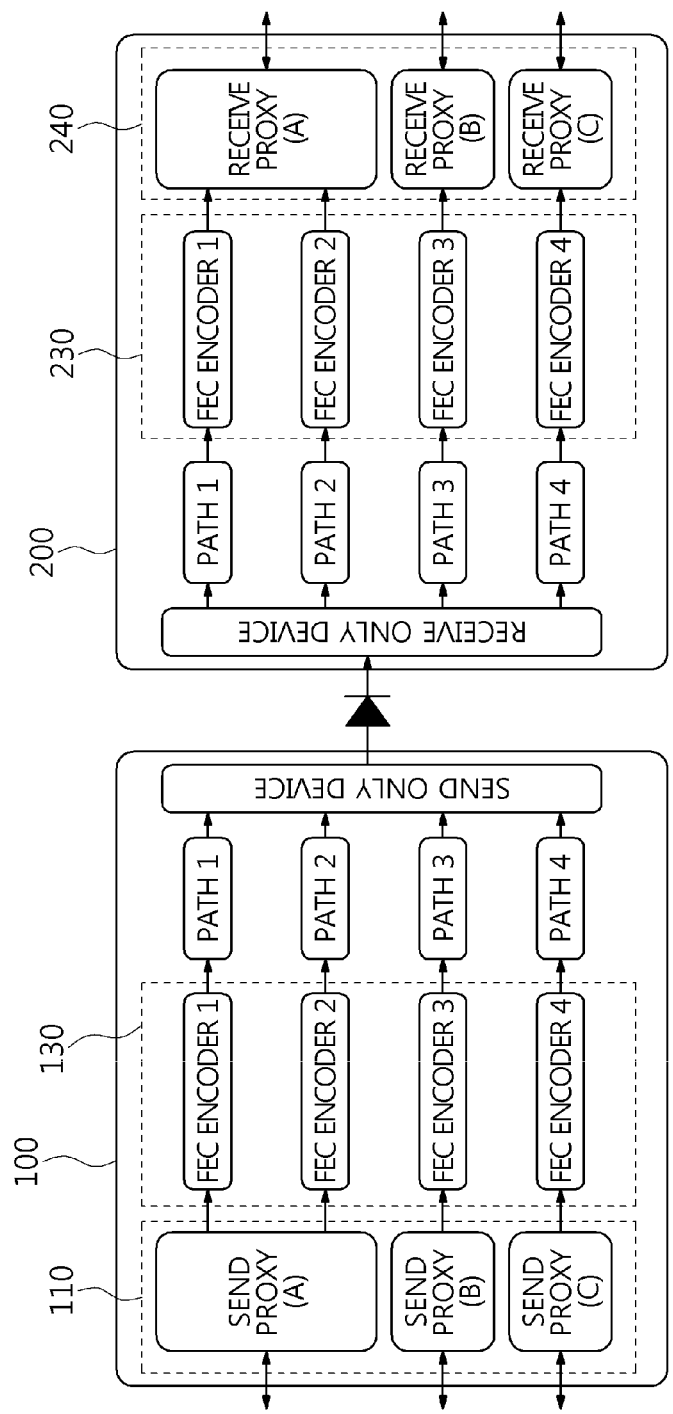
FIG. 3 is a block diagram illustrating in detail an example of the one-way data transmission/reception system illustrated in FIG. 2.

FIG. 3 is a block diagram illustrating an embodiment of the one-way data transmission/reception system illustrated in FIG. 2.

Referring to FIG. 3, a form is shown in which the encoder unit 130 for Application Layer-FEC (AL-FEC) (i.e. an FEC encoder) and the decoder unit 230 for AL-FEC (i.e. an FEC decoder) for each one-way data transmission path of the one-way data transmission/reception system are arranged. As shown in FIG. 3, in the one-way data transmission apparatus 100 and the one-way data reception apparatus 200, the send proxy unit 110 and the receive proxy unit 240, which form a pair, for transferring data from a high-security zone to a low-security zone may include multiple proxies for respective services, and may have one-way paths for respective proxies. Further, even in the case of the same service proxy, the proxy may have multiple one-way paths depending on the classification of important sessions (a pair of a source IP address and a destination IP address). Here, the service supported by the send proxy unit and the receive proxy unit may correspond to applications running on a Transmission Control Protocol (TCP) or a User Datagram Protocol (UDP). Here, the one-way data transmission apparatus 100 may transmit data to the reception apparatus through a one-way device that is physically isolated, and the UDP or another exclusive protocol that enables one-way data transmission may be used as the protocol between the transmission and reception apparatuses. When the transmission protocol between the one-way transmission apparatus 100 and the one-way data reception apparatus 200 is UDP, each one-way path may be divided into destination port-based UDP sessions (in which the source IP address and the destination IP address are fixed and the source port is systematically and automatically allocated).

Figure 4:
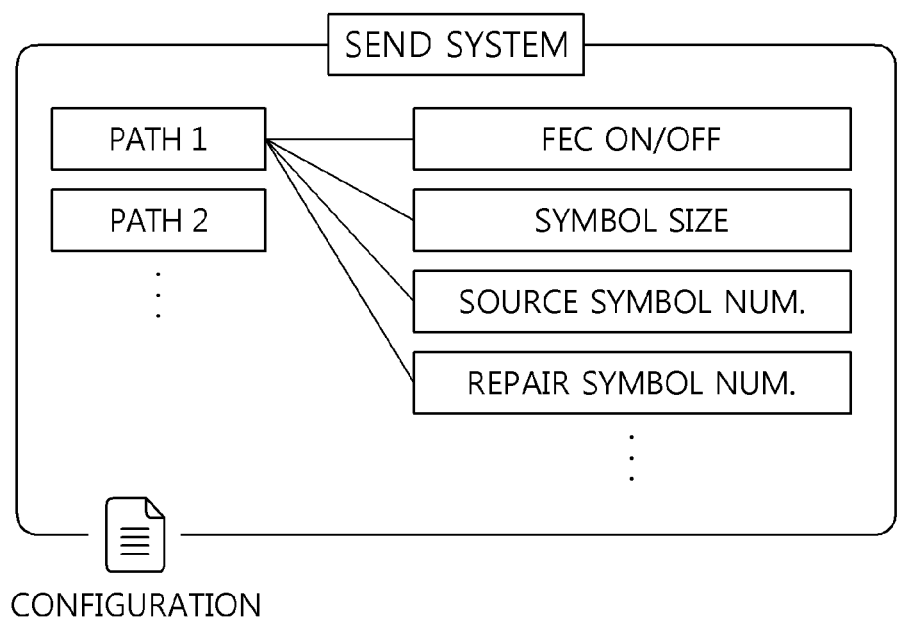
FIG. 4 is a diagram illustrating pieces of initial configuration information for respective one-way paths according to an embodiment of the present invention.

FIG. 4 is a diagram illustrating pieces of initial configuration information for respective one-way paths according to an embodiment of the present invention.

Referring to FIG. 4, it can be seen that an example of initial configuration information in a transmission system that is required to perform the above process is illustrated. As shown in FIG. 4, initial configuration details may include information such as information (i.e. FEC ON/OFF or FEC encoding ON/OFF) indicating whether to apply an FEC technique to each one-way path and configuration values (e.g. Symbol Size, Source Symbol Num, Repair Symbol Num, etc.) essentially required for the operation of the corresponding FEC technique. Here, "Symbol Size" may denote the maximum size of a message used for encoding, and "Source Symbol Num" may denote the number of one-way messages that are encoded once (the maximum size of a source block that is the unit of encoding and decoding in an FEC technique may be calculated by the multiplication of the Symbol Size and the Source Symbol Num). Further, "Repair Symbol Num" may denote the number of additional messages generated to be used for recovery when packet loss occurs. Such configuration values may be a minimum number of configuration values required for encoding/decoding, and may be changed and applied depending on the FEC algorithm that is used.

Figure 5:
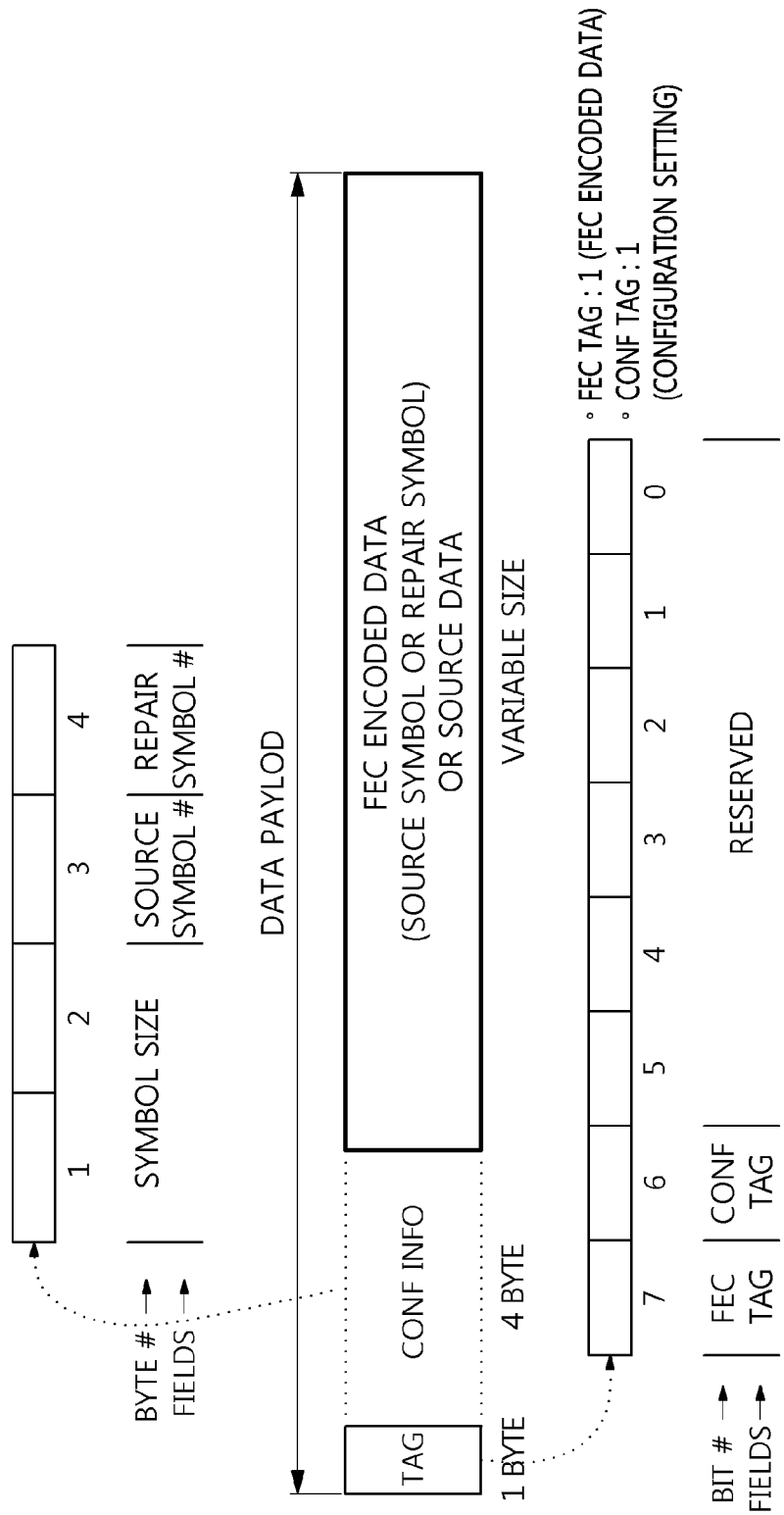
FIG. 5 is a diagram illustrating the message type of a one-way data transmission/reception system according to an embodiment of the present invention.

FIG. 5 is a diagram illustrating the message type of the one-way data transmission/reception system according to an embodiment of the present invention.

Referring to FIG. 5, before encoded data (FEC-encoded DATA such as a source symbol or a repair symbol) or source data that is not encoded (Source DATA) is transferred to the reception system depending on the configuration of each one-way path, tag information for notifying the reception system of the processing scheme to be performed by the reception system may be added to the encoded data or the source data. Basically, the tag information may be implemented and used as 1-byte information, and may include an FEC tag (FEC TAG) information bit and a configuration tag (CONF TAG) information bit. The remaining bit may be additionally used if necessary. First, the FEC TAG information bit identifies whether the corresponding message is an encoded message (1) or an unencoded message (0), and the CONF TAG information bit identifies whether encoding/decoding configuration for the current message has been changed (1: changed and 0: unchanged). If encoding/decoding configuration has been changed using a management tool or the like, the CONF TAG information bit may be set to 1, and the changed configuration value may be added, as in the form of FIG. 5. Generally, since the maximum possible size of a data zone in packets on the network is about 1500 bytes, the tag information may be sufficiently represented by only 2 bytes. Therefore, since the number of encoded messages is about 100 in consideration of message sending/receiving performance, the tag information may be sufficiently presented by 1 byte, but may be adjusted and used if necessary. Since such tag information may be used in messages, the reception system does not need to have separate configuration information, and may be immediately and equally applied in synchronization with the transmission system when configuration has been made as to whether an FEC technique is to be applied to the one-way path or when the configuration of the FEC technique that has been applied has been changed.

Figure 6:
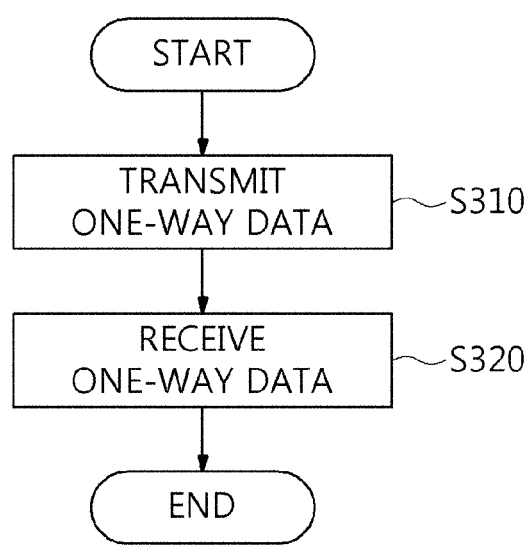
FIG. 6 is an operation flowchart illustrating a one-way data transmission method according to an embodiment of the present invention.
Figure 7:
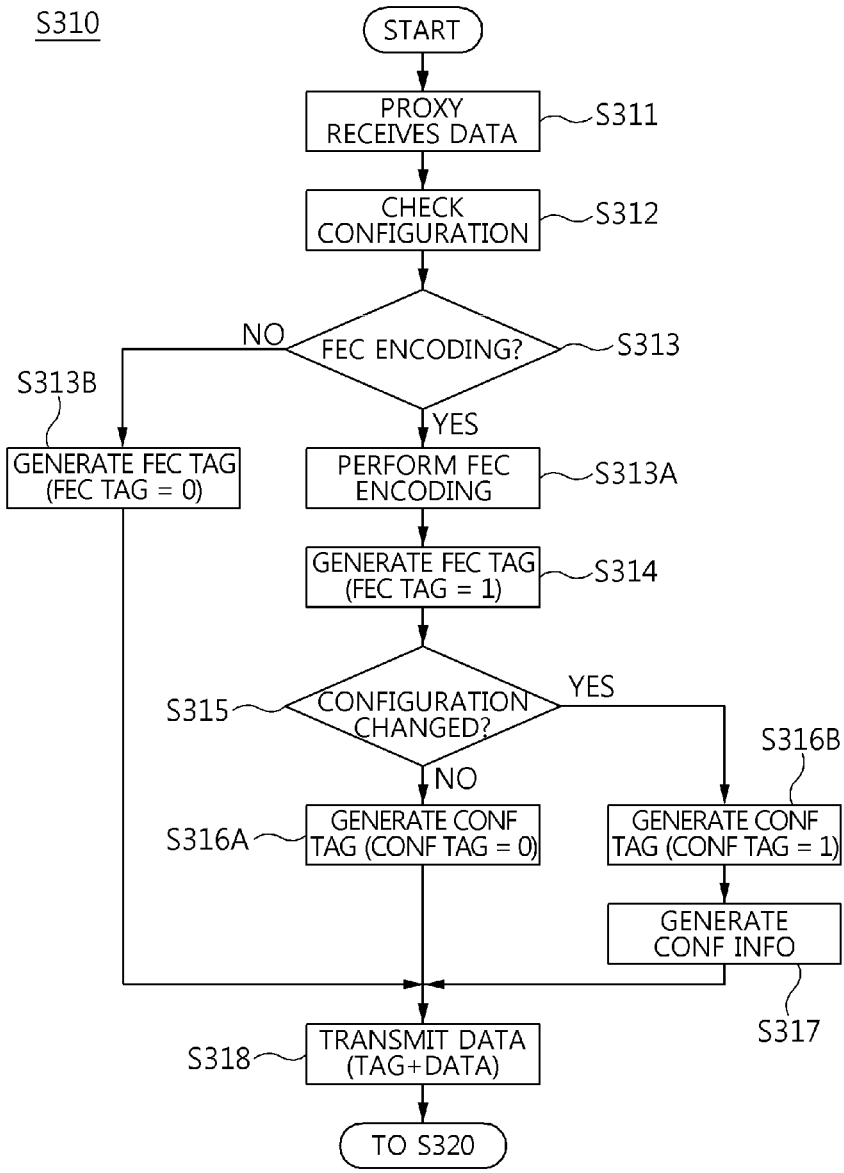
FIG. 7 is an operation flowchart illustrating in detail an example of the one-way data transmission step illustrated in FIG. 6.
Figure 8:
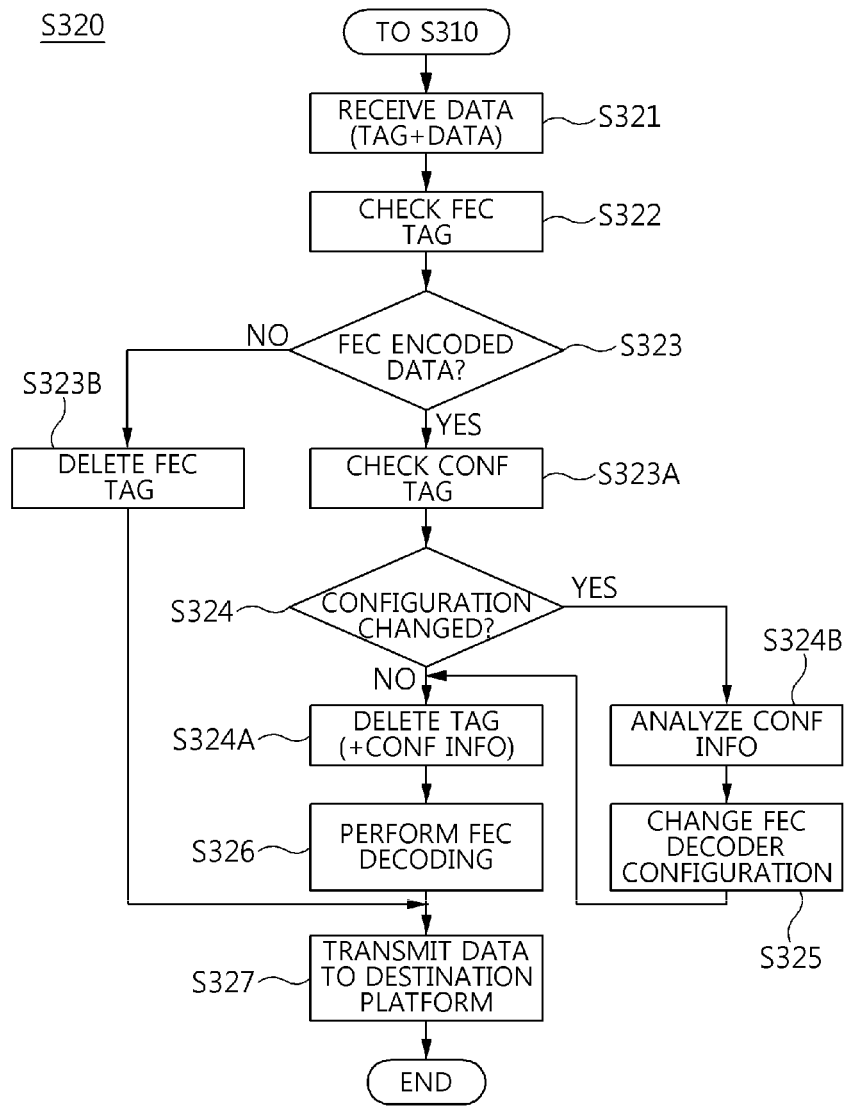
FIG. 8 is an operation flowchart illustrating in detail an example of the one-way data reception step illustrated in FIG. 6.

FIG. 6 is an operation flowchart illustrating a one-way data transmission/reception method according to an embodiment of the present invention. FIG. 7 is an operation flowchart illustrating in detail an example of the one-way data transmission step illustrated in FIG. 6. FIG. 8 is an operation flowchart illustrating in detail an example of the one-way data reception step illustrated in FIG. 6.

Referring to FIGS. 6 to 8, the one-way data transmission/reception method according to the embodiment of the present invention includes a one-way data transmission step S310 and a one-way data reception step S320.

In a procedure at the one-way data transmission step S310, a proxy receives data at step S311.

That is, at step S311, data to be actually transmitted is generated and managed through a send proxy. When the data to be transmitted data is generated, the configuration information of a one-way path through which the data is to be transferred is checked at step S312, and whether to encode the data is determined based on the results of the checking at step S313.

Here, when it is determined not to perform encoding (in the case of FEC OFF), only tag information in which an FEC tag (FEC TAG) is set to 0 may be generated at step S313B.

Further, in the procedure at step S310, only the tag information in which FEC TAG is set to 0 may be added to previously generated data, and resulting data may be transmitted to the reception system at step S318.

Further, when it is determined at step S313 to perform encoding (in the case of FEC ON), FEC encoding is performed at step S313A, and tag information in which FEC TAG is set to 1 may be generated at step S314.

In the procedure at step S310, whether initial configuration information has been changed (has been modified) may be checked in relation to the encoding configuration of the encoded data at step S315.

If, as a result of the checking at step S315, the initial configuration information has been changed using a management tool or the like (if at least one of FEC ON/OFF, Symbol Size, Source Symbol Num, and Repair Symbol Num has been changed), a configuration tag (CONF TAG) may be additionally set to 1 in the tag information, in which the FEC TAG is 1, at step S316B.

Here, in the procedure at step S310, configuration information (CONF INFO) containing the changed configuration information may be newly generated.

Further, in the procedure at step S310, CONF INFO containing the changed configuration information may be added to the previously generated data, and then resulting data may be transmitted to the reception system at step S318.

At steps S315 to S318, it is determined that initial configuration information has been changed even when the initial configuration information is initially applied, and thus the above procedure may be performed in the same manner (from the standpoint of the synchronization of configuration with the reception system).

Further, if, as a result of the checking at step S315, the initial configuration information has not been changed, only tag information in which CONF TAG is set to 0 in the tag information in which FEC TAG is 1 may be generated at step S316A.

Here, in the procedure at step S310, the tag information, in which FEC TAG is 1 and CONF TAG is 0, may be added to the previously generated data, and resulting data may be transmitted to the reception system at step S318.

Further, in a procedure at step S320, data (TAG+DATA or TAG+CONF INFO+DATA) generated through the operation of the above-described transmission system may be received through each one-way path at step S321.

In detail, in the procedure at step S320, the tag information of the received data may be checked at steps S322 and S323.

When, as a result of the checking of the tag information at steps S322 and S323, the received data is found not to be encoded data (when FEC TAG is 0), the tag information may be deleted from the data at step S323B.

Here, in the procedure at step S320, source data from which the tag information has been deleted may be transferred to a receive proxy, and the receive proxy may process the corresponding data and transfer the processed data to a final destination host (destination platform) at step S327.

Further, if the received data is found to be encoded data at step S323 (when FEC TAG is 1), CONF TAG may be checked at step S323A.

As a result of the checking of CONF TAG at step S323A, it may be determined whether to decode the encoded data based on the initial configuration information that has been previously applied (when CONF TAG is 0) or to decode the encoded information by applying new initial configuration information (when CONF TAG is 1) at step S324.

If, at step S324, it is determined to decode the encoded data based on the preciously applied initial configuration information, the tag information (+CONF INFO) may be deleted from the data at step S324A.

Further, in the procedure at step S320, decoding may be performed on the encoded data from which the tag information has been deleted at step S326.

Next, in the procedure at step S320, decoded data may be transmitted to a destination (destination platform) at step S327.

If, at step S324, the initial configuration information has been changed, the corresponding CONF INFO may be analyzed at step S324B.

Then, in the procedure at step S320, the configuration of the decoder may be changed, based on the results of the analysis of CONF INFO at step S324B, at step S325.

In the procedure at step S320, the tag information and the CONF INFO information may be deleted at step S324A. Thereafter, in the procedure at step S320, decoding may be performed on encoded data from which the tag information and the CONF INFO information have been deleted based on the changed configuration of the decoder at step S326.

Next, in the procedure at step S320, the decoded data may be transferred to the receive proxy, and may then be transmitted to the destination platform at step S327.

That is, through the data processing procedure in the one-way data transmission/reception method that uses the transmission system of the one-way data transmission apparatus 100 and the reception system of the one-way data reception apparatus 200, AL-FEC techniques suitable for required reliability levels and service performance levels may be applied to respective one-way paths.

Further, the AL-FEC techniques in the one-way data transmission/reception system may enable the configurations of the transmission system and the reception system to be synchronized with each other without causing packet loss, and configurations suitable for various one-way paths having different required reliability levels may be variously applied to respective one-way paths.

Figure 9:
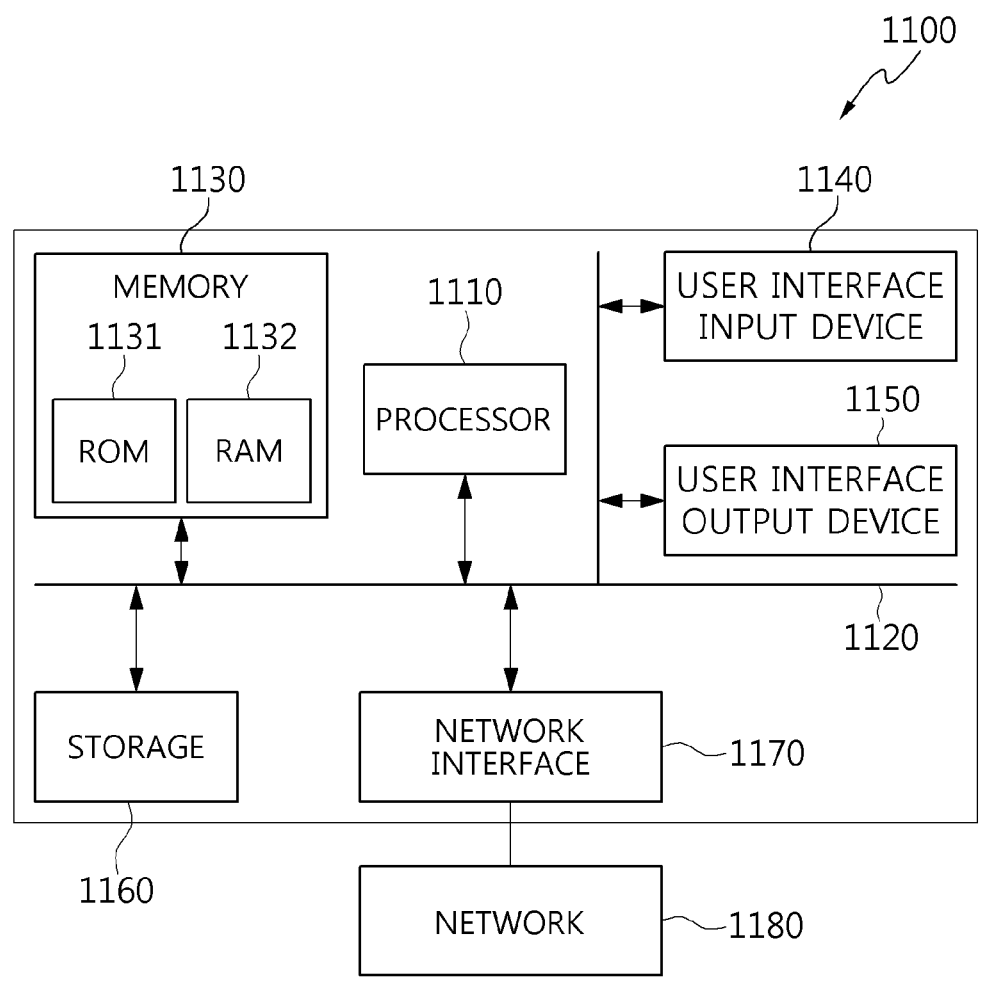
FIG. 9 is a block diagram illustrating a computer system according to an embodiment of the present invention.

FIG. 9 is a block diagram illustrating a computer system according to an embodiment of the present invention.

Referring to FIG. 9, an embodiment of the present invention may be implemented in a computer system 1100 such as a computer-readable storage medium. As shown in FIG. 9, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each of the processors 1110 may be a Central Processing Unit (CPU) or a semiconductor device for executing processing instructions stored in the memory 1130 or the storage 1160. Each of the memory 1130 and the storage 1160 may be a volatile or nonvolatile storage medium. For example, the memory 1130 may include Read Only Memory (ROM) 1131 or Random Access Memory (RAM) 1132.

The present invention may effectively provide an Application Layer-FEC (AL-FEC) technique for guaranteeing the reliability of one-way data that is transferred through a one-way data transmission/reception system.

Further, the present invention may secure the reliability of one-way transmission data by applying an FEC technique that enables independent dynamic configuration to each one-way path of a data transmission/reception system.

Furthermore, the present invention may prevent data loss from occurring due to the change in dynamic configuration depending on variation in a network environment by applying configurations suitable for respective reliability levels to various one-way data transmission paths between a transmission side and a reception side.

In addition, the present invention may enable flexible response to changing required reliability levels by performing a change in dynamic configuration in which a reception side is operated in synchronization with a transmission side merely by applying and changing configuration on the transmission side.

As described above, in the one-way data transmission apparatus, the one-way data reception apparatus, and the one-way data transmission/reception method using the apparatuses according to the present invention, the configurations and schemes in the above-described embodiments are not limitedly applied, and some or all of the above embodiments can be selectively combined and configured so that various modifications are possible.

What is claimed is:

1. A one-way data transmission apparatus, comprising:
   a send proxy unit for receiving data from a high-security zone through a one-way path;
   a configuration checking unit for determining whether to perform encoding from initial configuration information included in the data;
   an encoder unit for performing encoding on the data depending on results of the determination as to whether to perform encoding;
   a tag generation unit for generating tag information based on at least one of whether encoding has been performed and whether the initial configuration information has been changed; and
   a transmission unit for sending a message in which the tag information is added to the data to a one-way data reception apparatus.

2. The one-way data transmission apparatus of claim 1, wherein the initial configuration information comprises:
   Forward Error Correction (FEC) encoding ON/OFF information including information that indicates whether to perform encoding based on an FEC technique on the data;
   symbol size information corresponding to a maximum size of a message used to perform the encoding;
   source symbol number information corresponding to a number of messages on which the encoding is performed; and
   repair symbol number information corresponding to a number of additional messages generated to be used for recovery when packet loss occurs.

3. The one-way data transmission apparatus of claim 2, wherein the tag generation unit is configured to determine whether encoding has been performed on the data and to, if it is determined that encoding has been performed on the data, determine whether the initial configuration information has been changed.

4. The one-way data transmission apparatus of claim 3, wherein the tag generation unit is configured to determine whether the initial configuration information has been changed, and to, if the initial configuration information has been changed, generate a first initial configuration tag, add the first initial configuration tag to the tag information, and add the changed initial configuration information to the data.

5. The one-way data transmission apparatus of claim 4, wherein the tag information corresponds to a bit value, which is identified as any one of 0 and 1 and which indicates whether encoding has been performed and whether the initial configuration information has been changed.

6. A one-way data reception apparatus, comprising:
a reception unit for receiving a message in which tag information is added to data from a one-way data transmission apparatus;
a tag checking unit for checking the tag information and performing at least one of setting of decoding configuration of the data and deletion of the tag information from the message;
a decoder unit for performing decoding on the data depending on the setting of the decoding configuration; and
a receive proxy unit for transmitting the data to a low-security zone.

7. The one-way data reception apparatus of claim 6, wherein the tag checking unit is configured to check the tag information and to, if the data is found not to be encoded data, delete the tag information from the message.

8. The one-way data reception apparatus of claim 7, wherein the tag checking unit is configured to check the tag information and to, if the data is found to be encoded data, check an initial configuration tag of the tag information and then determine whether the initial configuration information has been changed.

9. The one-way data reception apparatus of claim 8, wherein the tag checking unit is configured to, if it is determined that the initial configuration information has been changed, set decoding configuration based on the changed initial configuration information, and delete the tag information and the initial configuration information from the message.

10. The one-way data reception apparatus of claim 9, wherein the tag checking unit is configured to, if it is determined that the initial configuration information has not been changed, delete the tag information and the initial configuration information from the message.

11. A one-way data transmission/reception method using a one-way data transmission apparatus and a one-way data reception apparatus, comprising:
receiving data from a high-security zone through a one-way path;
generating tag information of the data;
sending a message in which the tag information is added to the data to the one-way data reception apparatus;
receiving the message from the one-way data transmission apparatus;
checking the tag information of the message; and
transmitting the data to a low-security zone.

12. The one-way data transmission/reception method of claim 11, wherein the initial configuration information comprises:
Forward Error Correction (FEC) encoding ON/OFF information including information that indicates whether to perform encoding based on an FEC technique on the data;
symbol size information corresponding to a maximum size of a message used to perform the encoding;
source symbol number information corresponding to a number of messages on which the encoding is performed; and
repair symbol number information corresponding to a number of additional messages generated to be used for recovery when packet loss occurs.

13. The one-way data transmission/reception method of claim 12, wherein generating the tag information is configured to determine whether encoding has been performed on the data and to, if it is determined that encoding has been performed on the data, determine whether the initial configuration information has been changed.

14. The one-way data transmission/reception method of claim 13, wherein generating the tag information is configured to determine whether the initial configuration information has been changed, and to, if the initial configuration information has been changed, generate a first initial configuration tag, add the first initial configuration tag to the tag information, and add the changed initial configuration information to the data.

15. The one-way data transmission/reception method of claim 14, wherein the tag information corresponds to a bit value, which is identified as any one of 0 and 1 and which indicates whether encoding has been performed and whether the initial configuration information has been changed.

16. The one-way data transmission/reception method of claim 15, wherein checking the tag information is configured to check the tag information and to, if the data is found not to be encoded data, delete the tag information from the message.

17. The one-way data transmission/reception method of claim 16, wherein checking the tag information is configured to check the tag information and to, if the data is found to be encoded data, check an initial configuration tag of the tag information and then determine whether the initial configuration information has been changed.

18. The one-way data transmission/reception method of claim 17, wherein checking the tag information is configured to, if it is determined that the initial configuration information has been changed, set decoding configuration based on the changed initial configuration information, and delete the tag information and the initial configuration information from the message.

19. The one-way data transmission/reception method of claim 18, wherein checking the tag information is configured to, if it is determined that the initial configuration information has not been changed, delete the tag information and the initial configuration information from the message.

* * * * *